C. CARROLL.
AUTOMOBILE SAFETY CRANK.
APPLICATION FILED MAR. 24, 1915.
1,290,507. Patented Jan. 7, 1919.
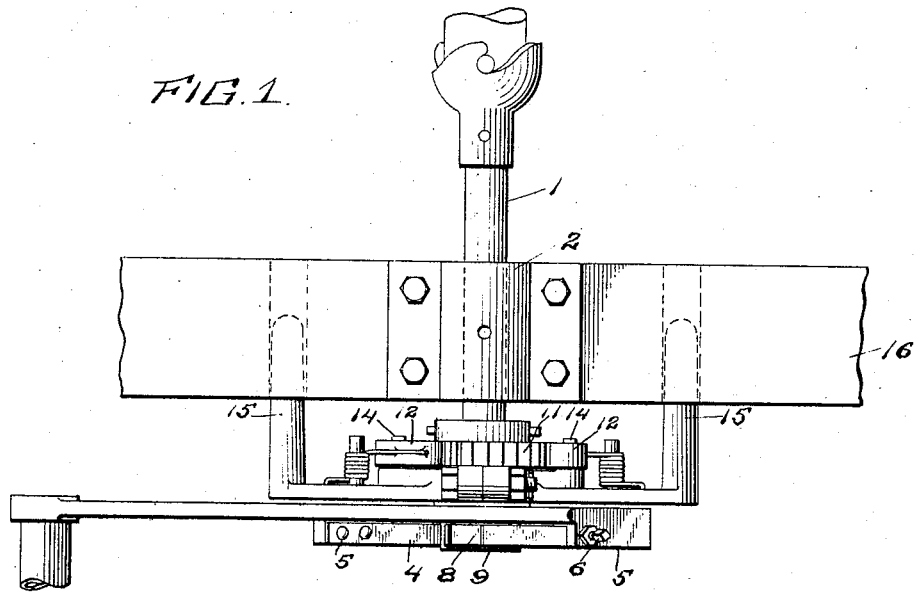
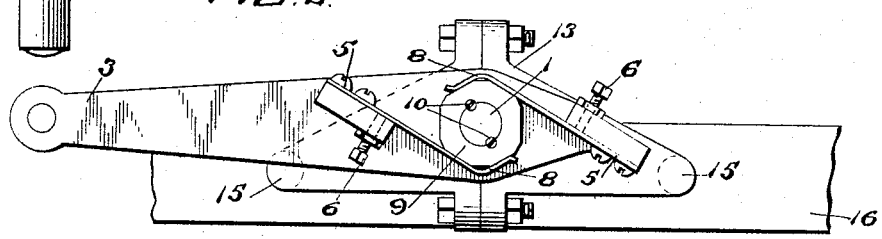
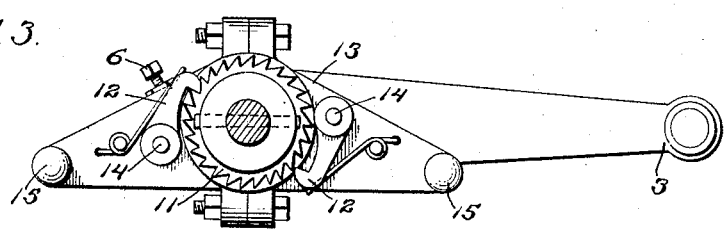
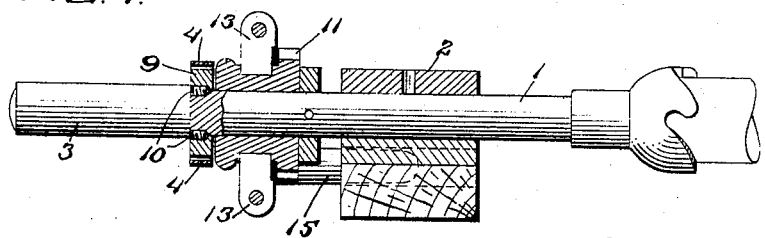
Inventor
Charles Carroll
Witnesses
By Knight Bros
Attorneys

UNITED STATES PATENT OFFICE.

CHARLES CARROLL, OF NEW ORLEANS, LOUISIANA.

AUTOMOBILE SAFETY-CRANK.

1,290,507.  Specification of Letters Patent.  Patented Jan. 7, 1919.

Application filed March 24, 1915. Serial No. 16,821.

*To all whom it may concern:*

Be it known that I, CHARLES CARROLL, a citizen of the United States, residing at New Orleans, in the parish of Orleans and State of Louisiana, have invented certain new and useful Improvements in Automobile Safety-Cranks, of which the following is a specification.

This invention has for its object to provide a crank which will not be driven backward under the so-called back firing of the engine, which is liable to occur when cranking is done with the spark too far advanced; and the invention consists primarily in interposing at some suitable point between the crank and the engine shaft, a driving connection which will insure rotation of the shaft by the crank under the energy bestowed upon the crank in the normal cranking operation, but which will yield to abnormal energy when suddenly imposed by the motor starting backward. While in its broadest aspect the invention contemplates an arrangement where the inertia of the crank or the momentum developed by its rotation in the cranking direction supplemented by such resistance as the operator's hand might safely contribute, is depended upon to develop resistance sufficient to release the aforesaid driving connection under back firing, I prefer to add a further safeguard against backward rotation, and to this end, a further feature consists in combining with the aforementioned automatically releasing driving connection, an automatically acting stop, preferably in the form of a pawl and ratchet, roller clutch, or some equivalent machine element that will permit free rotation in one direction only.

Further objects relate to the embodiment of the invention in a structure that is readily applicable to the cranking mechanism of an existing automobile, and to these ends, further features consist in providing a crank with resilient gripping arms, a polygonal head, relatively to which the crank is adapted to turn, but which is in position to be embraced by the resilient gripping arms of the crank, a ratchet in fixed relation to the crank so as to control its rotation, and pawls co-acting with the ratchet, that are mounted upon a pawl carrier designed to lie against existing portions of the automobile adjacent to the cranking shaft; all these parts being adapted to fit over and the polygonal head to be keyed to the existing shaft which is employed for cranking the engine, and to move axially inward and outward therewith in the act of engaging and disengaging the cranking shaft from the engine shaft.

The invention will be fully understood upon reference to the accompanying drawing, in which—

Figure 1 is a front view of an illustrative embodiment of the invention;

Fig. 2 is a plan view of the same, and

Fig. 3 is a side elevation, partly in section.

1 represents the cranking shaft and 2 the bearing in which it has inward and outward sliding movement, in a known type of automobile. 3 represents the crank which, according to the present invention, is not absolutely fixed with reference to the shaft 1, but has driving connection therewith, established through the medium of the resilient gripping arms 4, mounted at 5 upon the crank, with screws 6 for adjusting their tension and having reëntrant gripping faces 8 that are adapted to conform to the peripheral faces of a polygonal head 9, which is suitably keyed to the shaft 1, as for instance at 10. These resilient arms thus constitute in effect gripping jaws which will normally transmit rotary movement from the crank 3 to the shaft 1, but will yield in case of abnormal resistance to rotation in said shaft, or in case the shaft suddenly develops a counter-rotation and permits such counter-rotation to take place without carrying the shaft backward with it. Thus a safety drive is provided between the crank and the engine which will avoid transmitting the effects of a back fire in case the spark be carelessly timed before cranking.

In order to render the device doubly safe, notwithstanding the use of comparatively high tension in the gripping jaws 4, a ratchet 11 is provided and a co-acting pawl or pawls 12 are so combined, the one on the crank 3 and the other on a mounting 13, that the crank 3, while always free to rotate forwardly, is positively locked at all times against retrograde movement. In the embodiment selected for illustrating the invention, the ratchet is on the crank and the pawls are journaled upon the mounting at 14, which in turn bears at suitable points, such as 15, upon a fixed part of the automobile, so that it cannot rotate.

In the operation of the conventional form of cranking device, the cranking shaft such as 1 is moved axially in and out for making and breaking driving connection with the engine shaft. To permit this movement in the illustrative arrangement that I have described, the portions 15 of the mounting 13 through which it obtains its bearing upon a fixed part of the automobile, are in the form of fingers extending parallel with the axis of movement and resting, for instance, upon the inverted arched bolster 16.

From the foregoing description, it will be obvious that when the crank 3 is rotated in one direction, for instance counter-clockwise as in the present instance, its gripping jaws 4 will cause the polygonal head 9 and through it the shaft 1 to be rotated, the teeth of the ratchet 11 displacing the pawls 12 by their inclined faces. But in case a back fire occurs in the engine that drives the shaft 1 clockwise, the gripping jaws will yield and permit the head 9 to turn between them, since the crank 3 is provided with ratchet 11 and pawls 12 locking it against backward movement.

I claim:—

1. An automobile safety crank having a driving connection, comprising a polygonal head, and a pair of yieldingly held gripping jaws co-acting with said head, but adapted to yield under abnormal counter-force.

2. An automobile crank having at its hub, a faced head rotatable relatively to the crank and adapted to be applied to a shaft to be cranked, and yielding gripping means on the crank in position to co-act with the faced head; said gripping means comprising a pair of spring-pressed jaws.

3. An automobile crank having at its hub, a faced head rotatable relatively to the crank and adapted to be applied to a shaft to be cranked, and yielding gripping means on the crank in position to co-act with the faced head; said gripping means comprising a pair of spring-pressed jaws, and means for regulating their pressure.

The foregoing specification signed at New Orleans, Louisiana, this twenty-second day of March, 1915.

CHARLES CARROLL.

In presence of two witnesses:
BERTRAND KIERN,
WILLIAM C. McLEOD.